Aug. 4, 1931.   A. SOLDENHOFF   1,817,275
WING FOR AEROPLANES
Filed March 8, 1929

Inventor:
Alexander Soldenhoff
By
Attorney.

Patented Aug. 4, 1931

1,817,275

UNITED STATES PATENT OFFICE

ALEXANDER SOLDENHOFF, OF ZURICH, SWITZERLAND

WING FOR AEROPLANES

Application filed March 8, 1929, Serial No. 345,511, and in Germany March 8, 1928.

The present invention relates to a wing for aircraft whereof the profiles or cross-sectional areas are of varying shape from rib to rib so that the bottom side or pressure surface of the wing changes, as regards its form, from the ends towards the middle by adopting, from the plane or concave root of the wing towards the middle thereof, a convex shape whose radius of curvature gradually increases whence convexity disappears at the outer or free end of the wing with the result that the socalled median line of profile of the most convex section, that is in the middle of the wing, is less curved or arched than the median line of profile of the original profile at a point adjacent to the hull or body of the aircraft.

Further in a wing constructed according to my invention, the profile ends are, as regards the shape of the rear edge of the wing, more or less remote from the profile-chord or base line so that the said rear edge will possess a shape or configuration differing from that of the fore or frontal edge of the wing and the wing, taken as a surface, will be twisted.

Thus a kind of surface twisting results which is less dependent on differences between the angles of inclination or adjustment, but rather depend on the more or less adjusted median profile-line—which shows a least curvature approximately that of a symmetrical profile—so that the effect of a changed adjusting angle automatically results even when the profile rest on the same chord as the first profile.

The purpose of such a construction resides in the possibility of ensuring a best possible loading distribution of elliptic form without requiring—as a consequence of normal surface twisting—any increase of the resistance. If, moreover, the total supporting surface is given a sagittal shape, the said median profile of the wing will go on both sides of the body rearwards approximately in diagonal direction and as regards the efficiency of the profile (distribution of forces) and regarding the outer wings situated still farther towards the rear—and which may be given a negative adjustment—the profile will have the particular function of maintaining "balance" or equilibrium. For this reason the lower curvature or convexity of the wing is so dimensioned, according to the present invention, that the angle of the curved or convex profile line will remain (within or irrespective of any deviations of the adjusting angle) always the same with relation to the direction of the attacking air force.

Furthermore as the profiles are dimensioned or selected, in aero-dynamic respects, in a manner that the raising force coefficient and the resistance coefficient thereof will equalize each other at any least possible difference of the adjusting angle, a very low total profile resistance will result therefrom. Again, another object or purpose of such a construction (with a view to obviate the disadvantages arising from thoroughly plane or concave bottom surfaces with relation to the constructional height of the beams) resides in securing best possible strength conditions, for it is obvious that, in accordance with increasing convexity of the surface, the wing will be adapted to afford in the middle a correspondingly greater constructional height, whereby, especially in case of sagittal shapes, torsional stresses will be best counteracted or obviated viewing the fact that the surface means similar to a symmetrical profile proves more stable or constant in aerodynamic respects.

It is within the judgment of the constructing engineer to determine the degree of the described profile variation or change and to also decide whether, in connection therewith, the outer extremity of the wing, the rear edge thereof and the beams are to be shaped to form a thoroughly straight line or to constitute a slightly curved or broken line. Thus, for instance, the outer wing portion may be given a rapidly decreasing curvature or convexity and constructional height so that the wing will have a highly twisted appearance but that the chords of the profile change the adjusting angle (without being negative in the usual sense) a momentum which would mean or be equal to a higher cross-stability without any V-position of the wing being presupposed.

I will now proceed to describe my invention more in detail in connection with the embodiments thereof illustrated diagrammatically on the accompanying drawings, it being intended and understood that the invention is illustrated by, but not limited to the embodiments thereof so illustrated and described.

Figure 1:
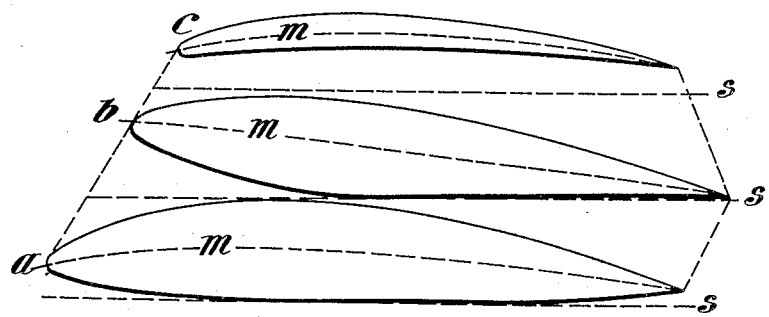
Fig. 1 illustrates three profiles of a wing all of which have the same chord.

In the accompanying drawings forming a part of this specification and showing for purposes of exemplification a few preferred forms in which the invention may be embodied and practised, Figure 1 illustrates three profiles of a wing all of which have the same chord. The profiles $a$ and $b$ have approximately the same constructional height or thickness, but they are greatly distinguished from each other respecting both the curvature or convexity and the profile median line $m$ shown in dotted lines and the direction or relation of said line to the chords $s$.

Figure 2:
Fig. 2 illustrates three profiles of a wing of varying chord.
Figure 3:
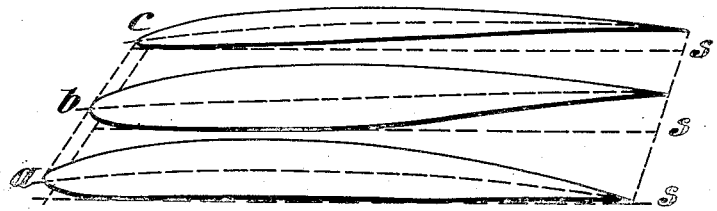
Fig. 3 illustrates three profiles in which intermediate and tip profiles have a negative angle.

It is to be noted that the profile does not increase in thickness or height, as in a normal profile of great constructional height or thickness, whereof the upper surface convexity increases or forms a steeper curve, but in accordance with the present invention the lower surface of the wing arches while the back or top thereof remains even or rather flattens, as shown in Figures 1 to 3. The so-called median profile $m$, as shown in all figures, is more straight in the profile $b$ than the median lines of the profiles $a$ and $b$. For instance, the profile back line of the intermediate profile $b$ could also be shaped from the very outset, that is from the nose, to form a steep curve just as in the other profiles, but a straighter median line would nevertheless result, because the end of the profile (the rear edge of the wing) would be highly raised. Figures 2 and 3, if the nose had a lower position. The course of the edge of the nose and the course of the rear edge of the wing are, as regards the direction, so different that they intersect at an acute angle when viewed from the front side of the aircraft.

The end profile $c$ again has an $m$-line similar to that of the profile $a$.

Referring to the embodiment illustrated in Figure 2, the adjusting angles of the profiles $a$, $b$ and $c$ are different from those in Figure 1, but the $m$-line relations respecting curvature or convexity and mutual location are the same, while in the embodiment shown in Figure 3 the intermediate profile, the $m$-line or longitudinal axis of the profile and the end profile have a negative adjusting angle or, the $a$-profile will have, during flight, a large impining angle.

In all embodiments shown a salient feature resides in that the profiles thereof pass over from the concave or plane $a$ to a highly convex curvature $b$ whence they change their form again inversely towards the end of the wing, irrespective of whether the single profiles have a similar or different chord adjusting angles and whether the noses or end-edges of the profiles extend in a straight line or direction or in broken or curved lines. It goes without mentioning that the said line of the profiles may vary or be modified without departing from the spirit and scope of the present invention, provided that they embody the principles described and inherent in the invention.

Figure 4:
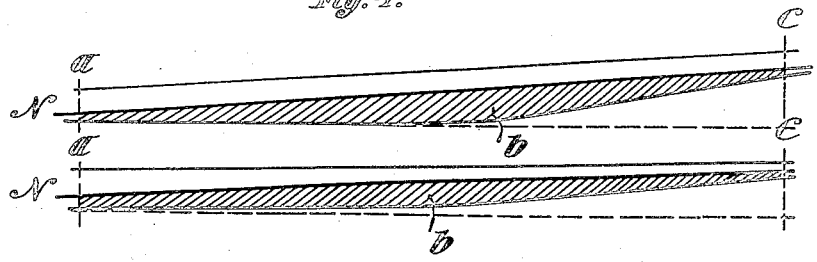
Fig. 4 illustrates front views of wings formed according to my invention.

Figure 4 illustrates wings in front view with sections $a$, $b$ and $c$ corresponding to the described profiles or cross-sections. N indicates the nose edge which in the one case is straight and in the other one broken. The hatched portions below these lines indicate or are the convex parts of the bottom surface which, as will be seen, increase towards the middle and decrease towards the ends.

What I claim is:—

1. An aeroplane wing having various profiles, comprising a lower side of convex curvature increasing from adjacent the fuselage to the wing center and decreasing again towards the wing tip, and the initial and final profiles having undersurfaces curved as desired and the increasing curvature in the center being caused solely by varying the underside of the profile, while the back of the wing at the fuselage is strongly arched and becomes progressively flatter towards the tips.

2. An aeroplane wing having various profiles, comprising a bottom side which increases towards the middle of the wing and decreases towards the ends of the wing, and the two end profiles being shaped to form bottom faces of any desired configuration, the initial profile being of great thickness and the further profiles gradually decreasing towards the end.

In testimony whereof I affix my signature.

ALEXANDER SOLDENHOFF.